(12) United States Patent
Schwenter et al.

(10) Patent No.: US 11,796,364 B2
(45) Date of Patent: Oct. 24, 2023

(54) CORIOLIS MEASURING SENSOR OF A CORIOLIS MEASURING INSTRUMENT AND A CORIOLIS MEASURING INSTRUMENT

(71) Applicant: Endress+Hauser Flowtec AG, Reinach (CH)

(72) Inventors: Benjamin Schwenter, Breitenbac (CH); Marc Werner, Grenzach-Wyhlen (DE); Claude Hollinger, Aesch (CH); Gebhard Gschwend, Allschwil (CH)

(73) Assignee: Endress+Hauser Flowtec AG, Reinach (CH)

( * ) Notice: Subject to any disclaimer, the term of this patent is extended or adjusted under 35 U.S.C. 154(b) by 199 days.

(21) Appl. No.: 17/413,449

(22) PCT Filed: Nov. 21, 2019

(86) PCT No.: PCT/EP2019/082018
§ 371 (c)(1),
(2) Date: Jun. 11, 2021

(87) PCT Pub. No.: WO2020/120092
PCT Pub. Date: Jun. 18, 2020

(65) Prior Publication Data
US 2022/0074776 A1 Mar. 10, 2022

(30) Foreign Application Priority Data
Dec. 11, 2018 (DE) ...................... 10 2018 131 742.5

(51) Int. Cl.
*G01F 1/84* (2006.01)
(52) U.S. Cl.
CPC .......... *G01F 1/8427* (2013.01); *G01F 1/8422* (2013.01); *G01F 1/8431* (2013.01); *G01F 1/8477* (2013.01)

(58) Field of Classification Search
CPC .... G01F 1/8422; G01F 1/8427; G01F 1/8431; G01F 1/8477
See application file for complete search history.

(56) References Cited

U.S. PATENT DOCUMENTS

| 4,756,198 A | 7/1988 | Levien |
| 4,811,606 A * | 3/1989 | Hasegawa ............. G01F 1/8486 73/861.357 |
| 2016/0187300 A1 | 6/2016 | Cage et al. |

FOREIGN PATENT DOCUMENTS

| CN | 102680036 A | 9/2012 |
| CN | 107810391 A | 3/2018 |

(Continued)

OTHER PUBLICATIONS

Wikipedia, Force between magnets, https://en.wikipedia.org/wlindex.php?title=Force_between_magnets&oldid=871010237, 9 pp. (last updated Nov. 28, 2018; last accessed Aug. 12, 2019).

*Primary Examiner* — Erika J. Villaluna
(74) *Attorney, Agent, or Firm* — Kelly J. Smith; Endress+Hauser (USA) Holding, Inc.

(57) ABSTRACT

The invention relates to a Coriolis measuring sensor for detecting a mass flow rate or a density of a medium flowing through a measurement tube of the Coriolis measuring instrument. The measurement tube has an inlet and an outlet designed to convey the medium between the inlet and the outlet; an exciter; and two sensors; the measuring sensor comprising a supporting element having a chamber designed to house the measurement tube at least in portions. The magnet device comprises a magnetically conductive holder for magnets and a first pair of magnets arranged on the holder on a first face of the coil device, with the magnets designed to cause a magnetic field perpendicularly to a cross-sectional plane of the coil, and the magnetic field of a (Continued)

first magnet of the pair is oriented so as to be opposite to the magnetic field of a second magnet of the pair.

16 Claims, 3 Drawing Sheets

(56) References Cited

FOREIGN PATENT DOCUMENTS

| | | |
|---|---|---|
| DE | 69327772 T2 | 6/2000 |
| DE | 102012201592 B3 | 3/2013 |
| DE | 102015120087 A1 | 5/2017 |
| DE | 202017006709 U1 | 3/2018 |
| JP | 8254452 A | 10/1996 |
| JP | 1151733 A | 2/1999 |
| JP | 11051733 A | 2/1999 |
| JP | 2005106574 A | 4/2005 |

* cited by examiner

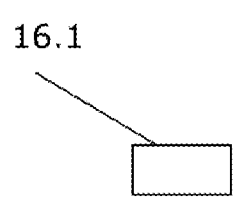
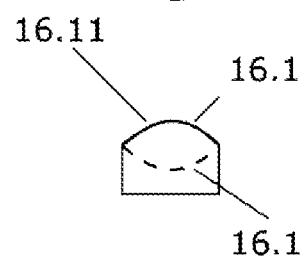
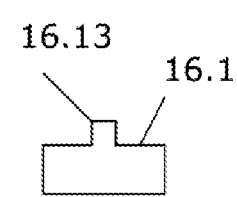
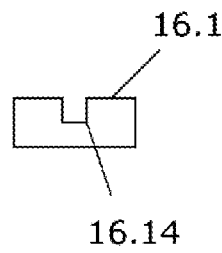

CORIOLIS MEASURING SENSOR OF A CORIOLIS MEASURING INSTRUMENT AND A CORIOLIS MEASURING INSTRUMENT

CROSS-REFERENCE TO RELATED APPLICATIONS

The present application is related to and claims the priority benefit of German Patent Application No. 10 2018 131 6742.5, filed on Dec. 11, 2018, and International Patent Application No. PCT/EP2019/082018, filed on Nov. 21, 2019, the entire contents of which are incorporated herein by reference.

TECHNICAL FIELD TECHNICAL FIELD

The invention relates to a Coriolis measuring sensor of a Coriolis measuring instrument for detecting a mass flow rate or a density of a medium flowing through at least one measurement tube of the Coriolis measuring instrument, and to such a Coriolis measuring instrument.

BACKGROUND

Core components of a Coriolis measuring sensor are vibration exciters and vibration sensors, which often have a magnet system with a coil device and a magnet device which are designed to interact with one another via electromagnetic fields. In the instance of an exciter, this interaction is utilized to excite at least one measurement tube to vibrate or, in the case of a sensor, to detect a vibration of at least one measurement tube.

The as of yet unpublished DE102018119941.4 shows a Coriolis measuring sensor with a magnet system in which a horseshoe-shaped magnet is designed to charge a coil device having a coil with a homogeneous magnetic field, which magnetic field is oriented perpendicular to a cross-sectional plane of the coil. Homogeneous magnetic fields have the disadvantage that relative movements between the coil and magnet cannot be detected well.

SUMMARY

The object of the invention is therefore to propose a Coriolis measuring sensor and a Coriolis measuring instrument which has a higher sensor sensitivity.

The object is achieved by a Coriolis measuring sensor according to independent claim 1, and by a Coriolis measuring instrument according to independent claim 15.

A Coriolis measuring sensor according to the invention of a Coriolis measuring instrument for detecting a mass flow rate or a density of a medium flowing through at least one measurement tube of the Coriolis measuring instrument comprises:
the at least one measurement tube having an inlet and an outlet, which tube is designed to convey the medium between the inlet and outlet;
at least one exciter which is designed to excite the at least one measurement tube to vibrate;
at least two sensors which are designed to detect the vibrations of at least one measurement tube;
wherein at least one exciter and at least one sensor respectively have a coil device with respectively at least one coil and respectively one magnet device, wherein the magnet device and the coil device are movable relative to one another,
wherein the measuring sensor has a supporting element which is designed to hold the at least one measurement tube, wherein the magnet device has a magnetically conductive holder, in particular a ferromagnetic holder for magnets, and at least one first pair of magnets which are arranged on the holder on a first face of the coil device,
wherein the magnets are respectively designed to cause a magnetic field perpendicular to a cross-sectional plane of the coil,
wherein the magnetic field of a first magnet of the pair is oriented so as to be opposite to the magnetic field of a second magnet of the pair.

Due to the local combination of two opposite, adjacent magnetic fields, even small relative movements lead to a significant induction of an electrical voltage in the coil device. Consequently, sensors according to the invention are highly sensitive to such relative movements.

The magnetically conductive holder is designed to merge magnetic field lines of the magnets of the first pair.

The magnets are manufactured from a samarium-cobalt alloy or from an aluminum-nickel-cobalt alloy, for example.

In one embodiment, the holder has a U-shape with a first arm and a second arm, and a base connecting the arms, wherein the holder encompasses the coil device such that the first arm is arranged on a first face of the coil device with respect to a coil cross-section, and wherein the second arm is arranged on a second face of the coil device,
wherein the first pair of magnets is arranged on an inner side of the first arm.

In particular, the magnets of the first pair are oriented along a relative movement with respect to the coil device.

Due to its magnetic conductivity, the second arm receives the magnetic fields of the magnets of the first pair and merges magnetic field lines.

In one embodiment, a second pair of magnets is arranged on an inner side of the second arm and opposes the first pair of magnets,
wherein opposing magnets respectively cause a rectified magnetic field.

In this way, a magnetic field strength in the region of the coil device can be increased, and a sharp spatial separation between the oppositely oriented magnetic fields can be achieved.

Consequently, sensors according to the invention are even more sensitive to such relative movements.

In one embodiment, the at least one coil has a central region and a winding region comprising the central region, wherein, in an idle state of the at least one measurement tube, a boundary between the magnets of a pair, as projected onto the cross-sectional plane, is located at least sectionally in the central region.

The coil device can, for example, be a sintered multilayer coil device which has a printed circuit board device having a plurality of printed circuit boards, wherein the coil is formed at least sectionally on one or more printed circuit boards by means of an electrically conductive conductor trace.

In one embodiment, the magnets respectively have a contact surface, by means of which contact surface they are contacted with the holder,
wherein the contact surface of at least one magnet of a respective pair has a first geometric structure, and wherein the holder has, in the region of the respective contact surface, a second geometric structure which is at least sectionally inverse to the respective first geometric structure, wherein the first geometric structure is uneven.

In this way, the adhesion of the magnets to the holder can be improved.

In one embodiment, the first geometric structure has, at least sectionally, a concave or convex curvature, and/or the first geometric structure has at least one projection and/or at least one recess, wherein the projection and/or the recess has a round or rectangular or polygonal cross-section.

In one embodiment, the magnets are fastened at least sectionally to the holder in the region of their particular contact surfaces, wherein the attachment is based on at least one of the following techniques: soldering, sintering, welding, gluing, spot welding, shrinking, impressing In one embodiment, the magnet is glued, wherein the adhesive is in particular a ceramic adhesive.

For example, an adhesive from the company Aremco with the designation of Ceramabond can be used.

In one embodiment, the coil of an exciter is designed to charge the associated magnet device with a force, and wherein the magnet device of a sensor is designed to induce an electrical voltage in the coil of the associated coil device.

In one embodiment, the measuring sensor has two collectors, wherein a first collector on an upstream side of the measuring sensor is designed to receive a medium flowing from a pipeline into the measuring sensor and to guide it to the inlet of the at least one measurement tube, wherein a second collector is designed to receive the medium exiting the outlet of the at least one measurement tube and guide it into the pipeline.

In one embodiment, the measuring sensor has two process connections, in particular flanges, which are designed to connect the measuring sensor to a pipeline.

In one embodiment, the magnet device is mechanically connected to the associated measurement tube, and wherein the coil device is fixed translationally as well as rotationally with respect to the inlet or outlet.

In one embodiment, the measuring sensor has a measurement tube, wherein the holder/coil device of the sensor or exciter is respectively fastened to the measurement tube, and wherein the coil device/holder of the sensor or exciter is respectively fastened to the supporting element, or wherein the measuring sensor has a pair of measurement tubes, wherein the holder/coil device of the sensor or exciter is respectively fastened to a first measurement tube, and the coil device/holder is respectively fastened to a second measurement tube.

In one embodiment, the Coriolis measuring sensor has two measurement tube pairs.

A Coriolis measuring instrument according to the invention comprises a Coriolis measuring sensor according to the invention; an electronic measuring/operating circuit, wherein the electronic measuring/operating circuit is designed to electrically charge the coils and optionally the associated temperature measuring instrument, wherein the charging of the coil and the temperature measuring instrument is effected by means of separate electrical connections or by means of multiplexing, wherein the at least one electrical connection of a sensor or exciter is guided to the electronic measuring/operating circuit by means of a cable guide, wherein the electronic measuring/operating circuit is further designed to determine and provide mass flow rate readings and/or density readings, wherein the measuring instrument has, in particular, an electronics housing for housing the electronic measuring/operating circuit.

The invention will now be described with reference to exemplary embodiments.

BRIEF DESCRIPTION OF THE DRAWINGS

FIG. 1 outlines the design of a Coriolis measuring instrument 1 with an exemplary Coriolis measuring sensor 10 according to the invention, wherein the measuring sensor has two measurement tubes 11 respectively having an inlet 11.1 and an outlet 11.2, an exciter 12, two sensors 13, two collectors 22, and two process connections 23. The exciter is designed to excite the two measurement tubes to vibrate perpendicular to a longitudinal measurement tube plane defined by the arc-shaped measurement tubes. The sensors are designed to detect the vibration impressed upon the measurement tubes. A first collector 22.1 on an upstream face of the measuring sensor is designed to receive a medium flowing into the measuring sensor from a pipeline and guide it to the inlets of the two measurement tubes; a second collector 22.2 is designed to receive the medium emerging from the outlets of the two measurement tubes and guide it into the pipeline. The collectors in turn respectively open into a process connection 23, which can be flanges 23.1, as shown here. The process sensors are designed to connect the Coriolis measuring sensor or the Coriolis measuring instrument to a pipeline.

Figure 1:
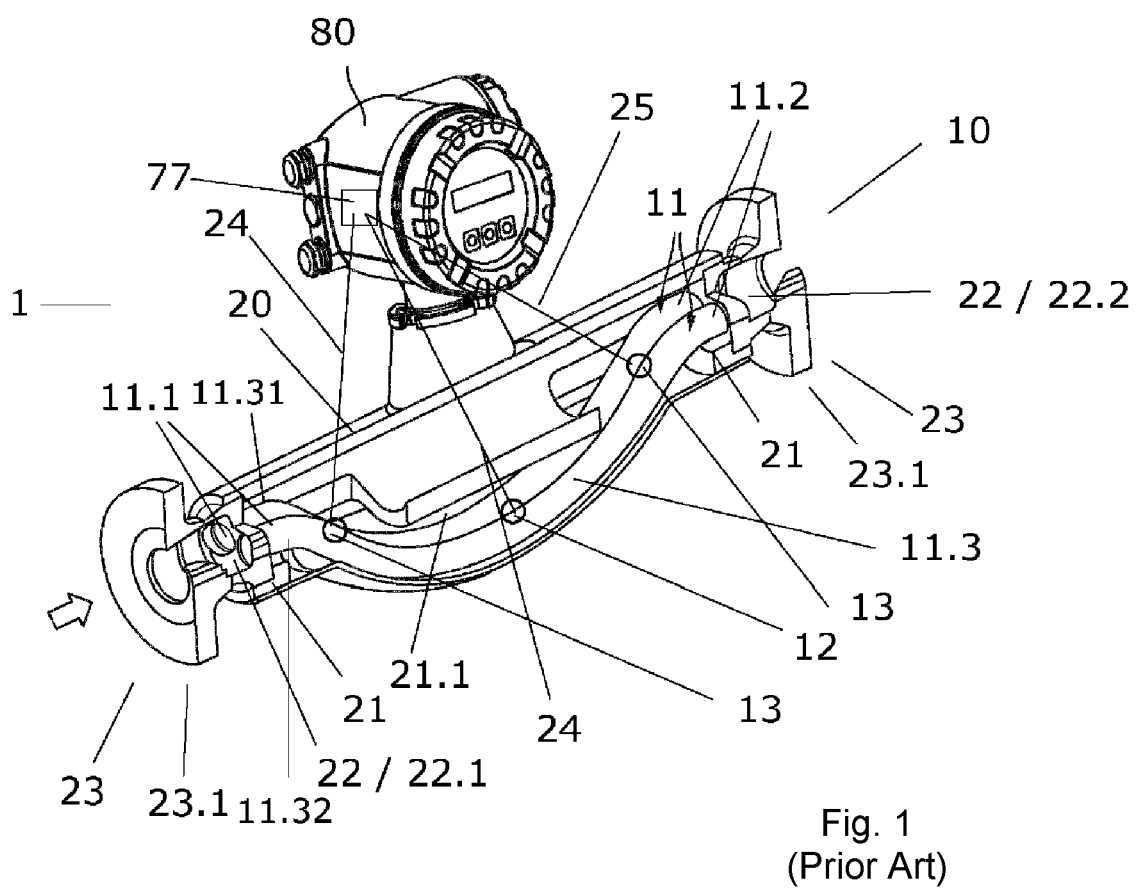
FIG. 1 outlines the design of a typical Coriolis measuring instrument.

The Coriolis measuring sensor is connected to an electronic housing 80 of the Coriolis measuring instrument which is designed to house an electronic measuring/operating circuit 77, which measuring/operating circuit is designed to operate the exciter arrangement and the sensor arrangements, and to determine and provide mass flow rate readings and/or density readings on the basis of vibration properties of the measurement tube as measured by means of the sensor arrangements. The exciter arrangement and the sensor arrangements are connected to the electronic measuring/operating circuit by means of electrical connections 24. The electrical connections 24 can respectively be merged by cable guides 25.

The Coriolis measuring sensor also has a fixing device 21 which is designed to define external vibration nodes of measurement tube vibrations.

A Coriolis measuring instrument according to the invention is not limited to the presence of two measurement tubes. Single-tube systems or multi-tube systems having more than two tubes are also conceivable.

DETAILED DESCRIPTION

The coil devices or magnet devices are fastened, via fastening devices provided for this purpose, either to a corresponding measurement tube or, for example, to the supporting element. The person skilled in the art will configure a fastening device according to his needs or according to technical requirements.

Figure 2:
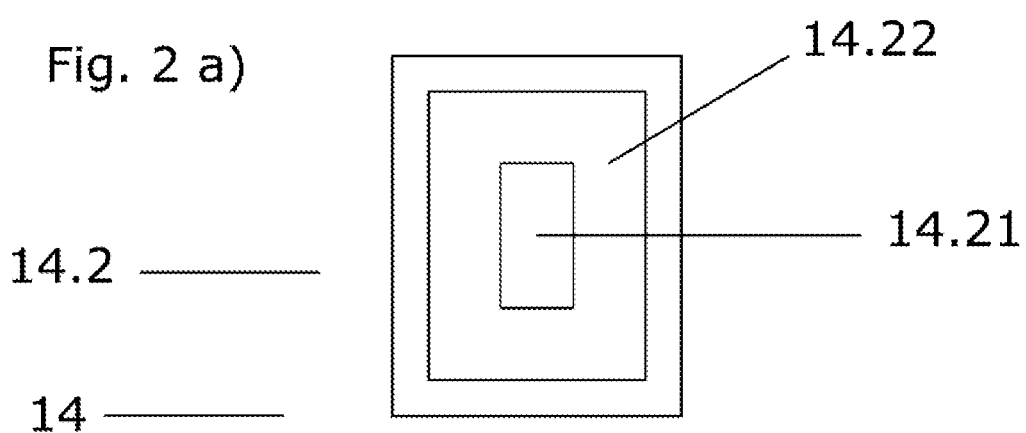
FIG. 2 a) shows a plan view of a coil device, and FIGS. 2b) and 2c) respectively show an exemplary embodiment of a coil device and a magnet device according to the present disclosure.
Figure 2:
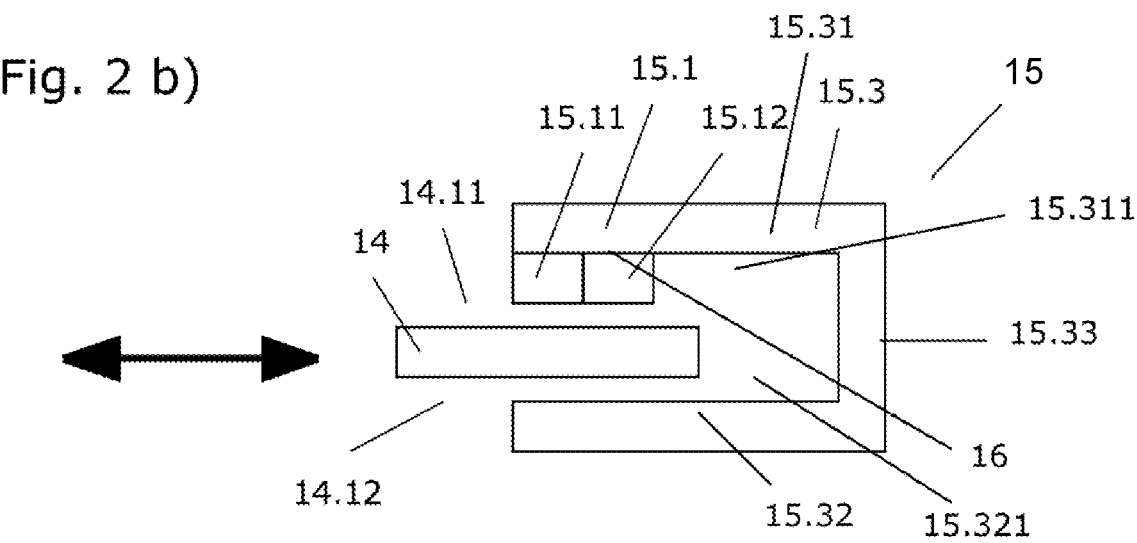
Figure 2:
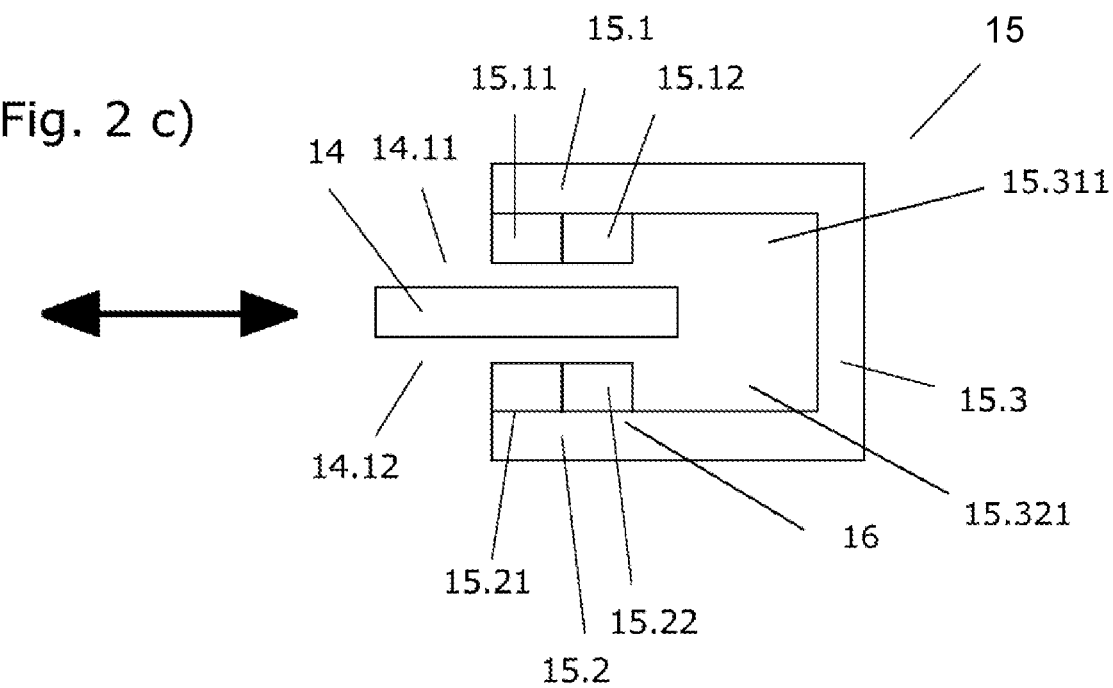
Figure 3A:
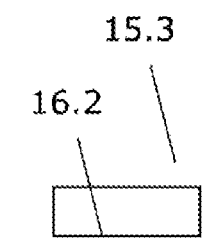
FIGS. 3a) to d) show various exemplary embodiments of a magnet according to the present disclosure.
Figure 3B:
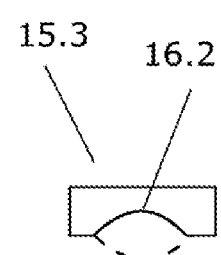
Figure 3C:
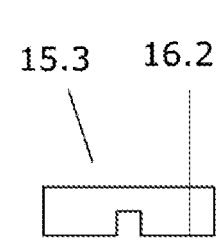
Figure 3D:
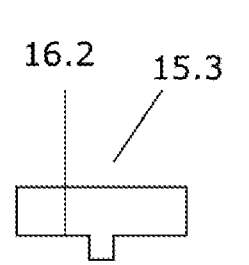

FIG. 2 *a*) shows a plan view of a coil device 14 with a coil 14.2. The coil has a winding region 14.22 and a central region 14.21 free of windings of the coil. The coil device can, for example, be a sintered multilayer coil device which has a printed circuit board device having a plurality of printed circuit boards, wherein the coil is formed at least sectionally on one or more printed circuit boards by means of an electrically conductive conductor trace.

FIG. 2 *b*) shows an exemplary embodiment of a coil device 14 and a magnet device 15 according to the invention. The coil device and the magnet device are movable relative to one another, parallel to a cross-sectional plane of the coil, so that measurement tube vibrations lead to a temporally varying magnetic field in the region of the coil device. The magnet device has a magnetically conductive holder 15.3 and at least one first pair of magnets 15.1, with a first magnet 15.11 and a second magnet 15.12 which are fastened to the holder on a first face 14.11 of the coil device. The first magnet and the second magnet are fixed to the holder in a spatially closely adjacent or contacting manner, such that the magnetic fields caused by them are oriented oppositely and are respectively perpendicular to the cross-sectional plane of the coil. The first magnet and the second magnet are thereby arranged sequentially along the direction of movement. The magnetically conductive, in particular ferromagnetic, holder 15.3 is designed to merge magnetic field lines and has no substantially inherent magnetic field. The opposition of the magnetic fields of the two magnets ensures a spatially strongly inhomogeneous total magnetic field in a boundary region of the magnets, wherein the inhomogeneity runs perpendicular to the cross-sectional plane of the coil. Due to the local combination of two opposite, adjacent magnetic fields, even small relative movements between coil device and magnet device lead to a significant induction of an electrical voltage in the coil device. Consequently, sensors according to the invention are highly sensitive to such relative movements.

Preferably, in an idle state of the at least one measurement tube, a boundary between the magnets of a pair, as projected onto the cross-sectional plane of the coil, is located at least sectionally in the central region. In this way, an effect of a relative movement on the coil with respect to the induction of an electrical voltage is amplified. It is furthermore advantageous if a spatial extent of the first pair of magnets along the direction of movement of the relative movement is larger than the central region of the coil.

As shown here, the holder can have a U-shape with a first arm 15.31 and a second arm 15.32 and a base 15.33 connecting the arms, wherein the holder encompasses the coil device so that the first arm is arranged on a first face of the coil device 14.11 with respect to a coil cross-section.

FIG. 2 *c*) shows another exemplary embodiment of a coil device 14 and a magnet device 15 according to the invention, wherein the holder 15.3 has a U-shape with a first arm 15.31 and a second arm 15.32 and a base 15.33 connecting the arms, wherein—different than as is shown in FIG. 2 *b*)—the magnet device now has two pairs of magnets, wherein a respective pair is fastened to an inner side of an arm, and wherein opposing magnets of the two pairs respectively cause a rectified magnetic field. In this way, a magnetic field strength in the region of the coil device can be increased, and a sharp spatial separation between the oppositely oriented magnetic fields can be achieved. Consequently, sensors according to the invention are highly sensitive to relative movements.

The magnets shown in FIGS. 2 *b*) and 2 *c*) are attached to the holder via contact surfaces 16, wherein attachment is based on at least one of the following techniques: soldering, sintering, welding, gluing, spot welding, shrinking, and impressing. In one embodiment, the magnet is glued, wherein the adhesive is in particular a ceramic adhesive. For example, an adhesive from the company Aremco under the designation of Ceramabond 865 can be used.

The holder thereby has a convex envelope which has typical dimensions of 8 millimeters in length, 9 millimeters in width, and 5 millimeters in height, wherein actual dimensions can deviate by up to 30% from the cited dimensions, wherein actual aspect ratios can deviate correspondingly from the aspect ratios arising from the cited dimensions.

A suitable material for the holder can be a stainless ferritic high-grade steel, for example, in particular having the material number 1.4105.

FIGS. 3 *a*) to *d*) show some exemplary geometric embodiments of corresponding sections of the holder 15.3 associated with magnets, in a side view, wherein the magnets have a first geometric structure 16.1, and wherein the holder has, in the region of the respective contact surface, a second geometric structure 16.2 which is at least sectionally inverse to the respective first geometric structure.

The magnets are manufactured from a samarium-cobalt alloy or from an aluminum-nickel-cobalt alloy, for example.

FIG. 3 *a*) shows an embodiment of a magnet that can be produced easily and economically, wherein the magnet is cuboid with planar side faces. Typical dimensions of such a magnet are within the range of 5 millimeters in length, 3.5 millimeters in width, and 2 millimeters in height, wherein actual dimensions may respectively deviate by up to 30% from the cited dimensions, wherein actual aspect ratios may correspondingly deviate from the aspect ratios arising from the cited dimensions.

FIG. 3 *b*) shows a magnet with a convex first geometric structure 16.11, wherein the first geometric structure may instead also be concave 16.12; see the dashed line.

FIG. 3 *c*) shows a magnet with a first geometric structure which has a projection 16.13.

FIG. 3 *d*) shows a magnet with a first geometric structure which has a recess 16.14.

The holder has a respective second geometric structure 16.2 which is at least sectionally inverse to the first geometric structure.

A first geometric structure or second geometric structure may also have shapes other than those shown, such as a triangular shape.

In this way, the magnets can be positioned neatly. However, the manufacture of the magnets and of the holders is technically more complex.

The invention claimed is:

1. A Coriolis measuring sensor of a Coriolis measuring instrument for detecting a mass flow rate or a density of a medium flowing through at least one measurement tube of the Coriolis measuring instrument, comprising:
   the at least one measurement tube having an inlet and an outlet, which tube is designed to convey the medium between the inlet and outlet;
   at least one exciter which is designed to excite the at least one measurement tube to vibrate; and
   at least two sensors which are designed to detect vibrations of at least one respective measurement tube,
   wherein the at least one exciter and/or at least one sensor respectively have a coil device with respectively at least one coil and a respective magnet device, wherein the magnet device and the coil device are movable relative to one another, parallel to a cross-sectional plane of the coil, wherein the measuring sensor has a supporting element which is designed to hold the at least one measurement tube, wherein the magnet device has a magnetically conductive ferromagnetic holder for magnets, and at least one first pair of magnets which are arranged sequentially on the holder along the direction of movement on a first face of the coil device, wherein the magnets are respectively designed to cause a magnetic field perpendicular to the cross-sectional plane of the coil, and wherein the magnetic field of a first magnet of the first pair is oriented opposite to the magnetic field of a second magnet of the pair.

2. The Coriolis measurement sensor of claim 1, wherein the holder has a U-shape with a first arm and a second arm, and a base connecting the arms, wherein the holder encompasses the coil device such that the first arm is arranged on a first face of the coil device with respect to a coil cross-section, and wherein the second arm is arranged on a second face of the coil device, and wherein the first pair of magnets is arranged on an inner side of the first arm.

3. The Coriolis measurement sensor of claim 2, wherein a second pair of magnets is arranged on an inner side of the second arm and opposes the first pair of magnets, and wherein opposing magnets respectively cause a rectified magnetic field.

4. The Coriolis measurement sensor of claim 1, wherein the at least one coil has a central region and a winding region comprising the central region, and wherein, in an idle state of the at least one measurement tube, a boundary between the magnets of a pair, as projected onto the cross-sectional plane, is located at least sectionally in the central region.

5. The Coriolis measurement sensor of claim 1, wherein the magnets respectively have a contact surface, by means of which contact surface they are contacted with the holder, wherein the contact surface of at least one magnet of a respective pair has a first geometric structure, and wherein the holder has, in the region of the respective contact surface, a second geometric structure which is at least sectionally inverse to the particular first geometric structure, and wherein the first geometric structure is in particular uneven.

6. The Coriolis measurement sensor of claim 5, wherein the first geometric structure has a concave or convex curvature, at least sectionally.

7. The Coriolis measurement sensor of claim 5, wherein the first geometric structure has at least one projection having a round, rectangular, or polygonal cross-section.

8. The Coriolis measurement sensor of claim 5, wherein the first geometric structure has at least one recess having a round, rectangular, or polygonal cross-section.

9. The Coriolis measurement sensor of claim 1, wherein the magnets are fastened at least sectionally to the holder in the region of their respective contact surfaces, and wherein the attachment is based on at least one of the following techniques: soldering, sintering, welding, gluing, spot welding, shrinking, and impressing.

10. The Coriolis measurement sensor according to claim 9, wherein the magnet is glued and the adhesive is in particular a ceramic adhesive.

11. The Coriolis measurement sensor of claim 1, wherein the coil of an exciter is designed to charge the associated magnet device with a force, and wherein the magnet device of a sensor is designed to induce an electrical voltage in the coil of the associated coil device.

12. The Coriolis measurement sensor of claim 1, wherein the measuring sensor has two collectors, wherein a first collector on an upstream side of the measuring sensor is designed to receive a medium flowing from a pipeline into the measuring sensor and guide it to the inlet of the at least one measurement tube, and wherein a second collector is designed to receive the medium exiting the outlet of the at least one measurement tube and guide it into the pipeline.

13. The Coriolis measurement sensor of claim 1, wherein the measuring sensor has two process connections, in particular flanges, which are designed to connect the measuring sensor to a pipeline.

14. The Coriolis measurement sensor of claim 1, wherein the magnet device is mechanically connected to the at least one measurement tube, and wherein the coil device is fixed translationally as well as rotationally with respect to the inlet or outlet.

15. The Coriolis measurement sensor of claim 1, wherein the measuring sensor has two measurement tube pairs.

16. A Coriolis measuring instrument, comprising:

a Coriolis measuring sensor of a Coriolis measuring instrument for detecting a mass flow rate or a density of a medium flowing through at least one measurement tube of the Coriolis measuring instrument, comprising:

the at least one measurement tube having an inlet and an outlet, which tube is designed to convey the medium between the inlet and outlet;

at least one exciter which is designed to excite the at least one measurement tube to vibrate; and at least two sensors which are designed to detect vibrations of at least one respective measurement tube, wherein the at least one exciter and/or at least one sensor respectively have a coil device with respectively at least one coil and a respective magnet device, wherein the magnet device and the coil device are movable relative to one another, parallel to a cross-sectional plane of the coil, wherein the measuring sensor has a supporting element which is designed to hold the at least one measurement tube, wherein the magnet device has a magnetically conductive ferromagnetic holder for magnets, and at least one first pair of magnets which are arranged sequentially on the holder along the direction of movement on a first face of the coil device, wherein the magnets are respectively designed to cause a magnetic field perpendicular to the cross-sectional plane of the coil, and wherein the magnetic field of a first magnet of the first pair is oriented opposite to the magnetic field of a second magnet of the pair; and an electronic measuring/operating circuit, wherein the electronic measuring/operating circuit is designed to electrically charge the coils, wherein the charging of the coils is effected by means of separate electrical connections using multiplexing, wherein the at least one electrical connection of a sensor or exciter is guided to the electronic measuring/operating circuit by means of a cable guide, wherein the electronic measuring/operating circuit is further designed to determine and provide mass flow rate readings and/or density readings, and wherein the measuring instrument has in particular an electronics housing for housing the electronic measuring/operating circuit.

* * * * *